United States Patent [19]

Hoffman, Jr. et al.

[11] Patent Number: 4,525,707
[45] Date of Patent: Jun. 25, 1985

[54] GAS PANEL INTERROGATION BY SELECTIVE SUSTAIN

[75] Inventors: Harry S. Hoffman, Jr., Saugerties; Donald R. Thompson; Luther L. Zimmerman, both of Woodstock, N.Y.

[73] Assignee: International Business Machines Corporation, Armonk, N.Y.

[21] Appl. No.: 336,526

[22] Filed: Dec. 31, 1981

[51] Int. Cl.³ .............................................. G09F 9/30
[52] U.S. Cl. ................................ 340/707; 315/169.4; 340/776; 340/779; 365/116
[58] Field of Search ............... 340/707, 708, 776, 779; 315/169.4; 365/116

[56] References Cited

U.S. PATENT DOCUMENTS

| 3,796,997 | 3/1974 | Johnson et al. | 315/169.4 X |
| 3,887,767 | 6/1975 | Miller | 340/708 X |
| 3,919,591 | 11/1975 | Criscimagna | |
| 3,976,992 | 8/1976 | Criscimagna et al. | 340/708 |
| 4,117,471 | 9/1978 | Schlig et al. | 340/708 |
| 4,139,803 | 2/1979 | Kurshashi et al. | |

OTHER PUBLICATIONS

Fujitsu Scientific & Technical Journal, vol. 12, No. 4, Dec. 1976, pp. 83–97, M. Shimuzu et al, "New and Simple Readout From 480-Character Plasma Display Panel".

Primary Examiner—David L. Trafton
Attorney, Agent, or Firm—Frederick D. Poag

[57] ABSTRACT

A gas panel can provide optical data readout in an essentially serial manner for copying, communication, interaction and indication. This is accomplished by using substitute sustain cycles for reading particular addresses. A complement sustain signal obtained through the address selection circuitry is superimposed on a partial sustain signal to produce the substitute sustain signal. This provides a complete sustain cycle for the selected address(es) only. Flashes of light at the addressed positions indicate storage of logical "1s" at such addresses.

10 Claims, 4 Drawing Figures

GAS PANEL INTERROGATION BY SELECTIVE SUSTAIN

BACKGROUND OF THE INVENTION

1. Field of Invention

This invention relates to optical detection of the contents of a pel in a gas panel.

2. Prior Art

Previous approaches have included optical isolation of a portion of the panel so that a pel was spacially segregated from another pel in order to separately interrogate them. This involves considerable complexity and expense in the optical system.

Alternately, electrical current sensing of the selected address is possible, however, it involves elaborate sense circuitry. An example is seen in U.S. Pat. No. 3,761,987.

Unlike cathode ray tube (CRT) displays wherein each pel is intensified at a unique time, gas panels frequently use a sustain system that energizes, i.e. "fires", all of the pels of the display simultaneously. Thus, unlike the CRT case, the pels of such gas panels are not differentiable with respect to time.

A solution to the problem is shown in U.S. Pat. No. 3,976,992. In that patent, the sustain signal can be "disturbed" with respect to one pel at a time by changing the shape of the normal sustain signal. This allows time-responsive "light pen" techniques, generally like those used with CRT displays, to identify a given pel. The particular method of "disturbing" the sustain signal so as to make it differentiable in that patent is to lengthen one half of the sustain signal applied to a given cell by adding a sliver of energy to the leading edge of a sustain pulse so that the resulting flash of light is out-of-cadence, that is comes earlier, than would be the case if it were undisturbed. However, the fact that the sustain signal is lengthened by use of a supplementary advance signal introduces requirements of precision, particularly in regard to exact juxtaposition of pulse portions from different gate circuits, which can be undesirable.

It is desirable to sense the information content of a pel or pels with minimum alteration of the normal operating conditions of a gas panel and to minimize the sensing equipment.

SUMMARY OF THE INVENTION

In a gas panel system, it is an object of this invention to use the write/erase addressing means to provide a selective sustain signal resulting in an effective sustain cycle only at the selected address(es).

It is another object of this invention to provide an improved gas panel system having means for optically detecting data stored therein on a pel by pel or multiple pel readout basis.

It is another object of this invention to provide improved optical and electrical filtering to minimize noise signals in a gas panel readout system.

It is another object of this invention to provide simple means to copy information stored in a gas panel into a buffer, so as to provide an ability to temporarily change the information content of a portion of the panel for a cursor or other interactive means.

In one arrangement according to this invention, a gas panel with X and Y coordinate lines has a selectable "selective sustain" cycle with the first half of the sustain drive partially or wholly missing at the positions of all or a large group of pels so as to constitute, at most, a partial-sustain signal having no independent effect. The missing half cycle component is supplied to a particular pel or pels by the addressing circuitry similarly to the write and erase pulses so that the information content at the addressed positions can be read optically.

According to another aspect of the invention, light flash detection means are provided which respond to the whole or a large part of a gas panel so as to facilitate automatic read out of the data stored in the panel.

According to another aspect of the invention an optical detection system is provided which operates from the rear of the gas panel, so as to provide large area detection and to enable differential optical filtering of ambient light form the detected signal.

DESCRIPTION OF A PREFERRED EMBODIMENT

Figure 1:
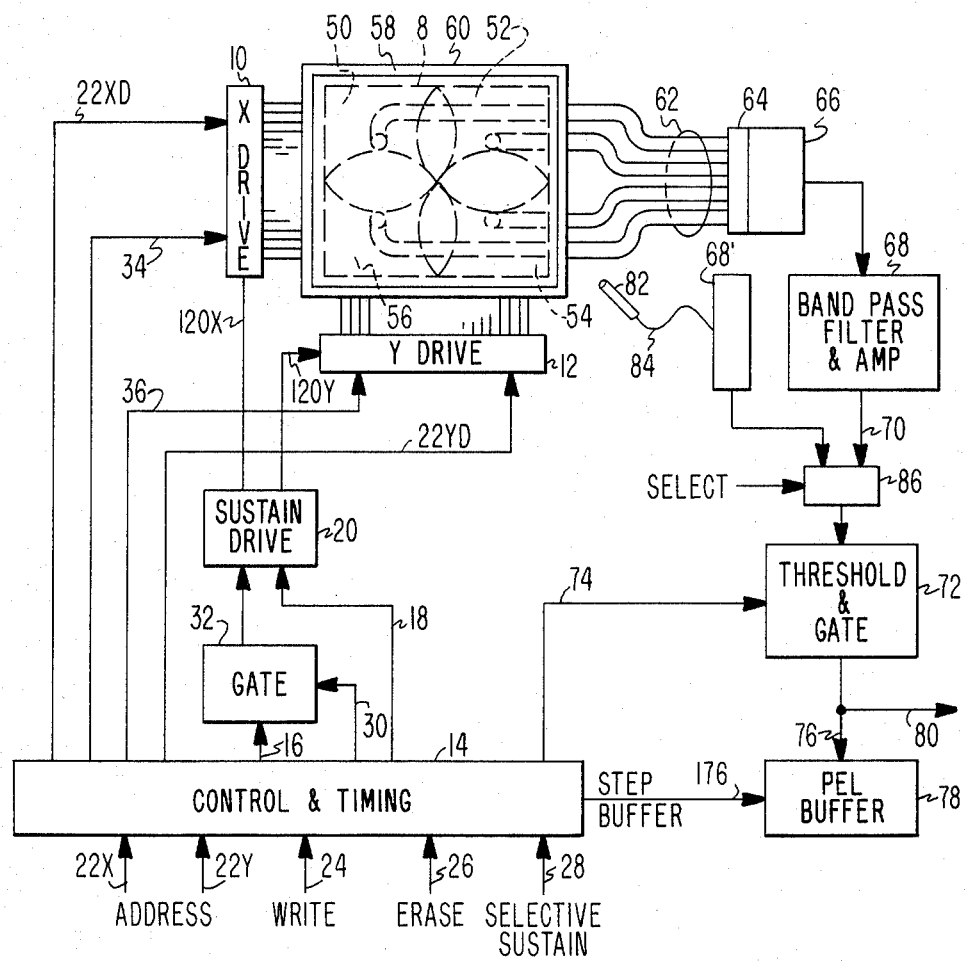
FIG. 1 is a block diagram of a preferred embodiment of the invention, showing logical functions connected to a gas panel for carrying out the method of the invention, and a preferred detector system for cooperation therewith.

FIG. 1 shows an A.C. gas display panel 8 of the general kind described in U.S. Pat. No. 3,976,992. X drive circuitry 10 and Y drive circuitry 12 operate respective arrays of conductors in front and back plate structures of the panel to set up wall charges at X, Y intersections and to sustain those charges in an A.C. manner whereby dots or pels of light are seen at the X, Y points (herein referred to as cells) having such charge storage. Control and Timing circuitry 14 provides outputs 16 and 18 which are operable to control sustain drive circuitry 20 to operate the X, Y drivers 10, 12 to supply complementary A.C. voltages to the X, Y array in the usual manner.

The system of FIG. 1 also includes the usual address inputs 22X, 22Y, and write and erase controls 24, 26. In accordance with the present invention, a selective sustain control 28 is provided, operable via control line 30 and gate 32 to modify the operation of the sustain drive 20 momentarily to render a sustain cycle effectively inoperative. At the same time, control 14 operates via lines 34, 36 to superimpose supplementary sustain signals which complement the modified sustain drive signals, at addresses specified via the inputs 22X and 22Y.

The write and erase signals are those normally used in a gas panel.

In the illustrated embodiment, during a selective sustain cycle, the gate 32 blocks the sustain drive for the X array panel conductors driving the first half of the normal sustain cycle signal whereby the potential on those conductors is insufficient for sustain action. However, at the same time, address data from inputs 22X, 22Y and enable drives on lines 34 and 36 are employed to complement the first half of the sustain signal as it is applied to the X line(s) of the selected cell(s) and to negate the sustain signal as applied to the Y lines of non-selected cell(s). This means that on a selective sustain cycle only the selected addresses will receive a first half sustain cycle signal thereby igniting any "1s" (i.e. firing stored charge pels) at those addresses. The second half of the sustain cycle signal will also ignite these pels, but no others, and restore the wall charge condition to its original state. Thus, two flashes of light will be emitted at each such pel, and the presence or absence or a stored "1" at the thus tested address can be detected.

After the selective sustain operation, the information stored in the panel will be identical to the initial condition. Some regular sustain cycles should be interspersed between the selective sustain cycles to prevent slow attrition of the stored condition.

Figure 2:
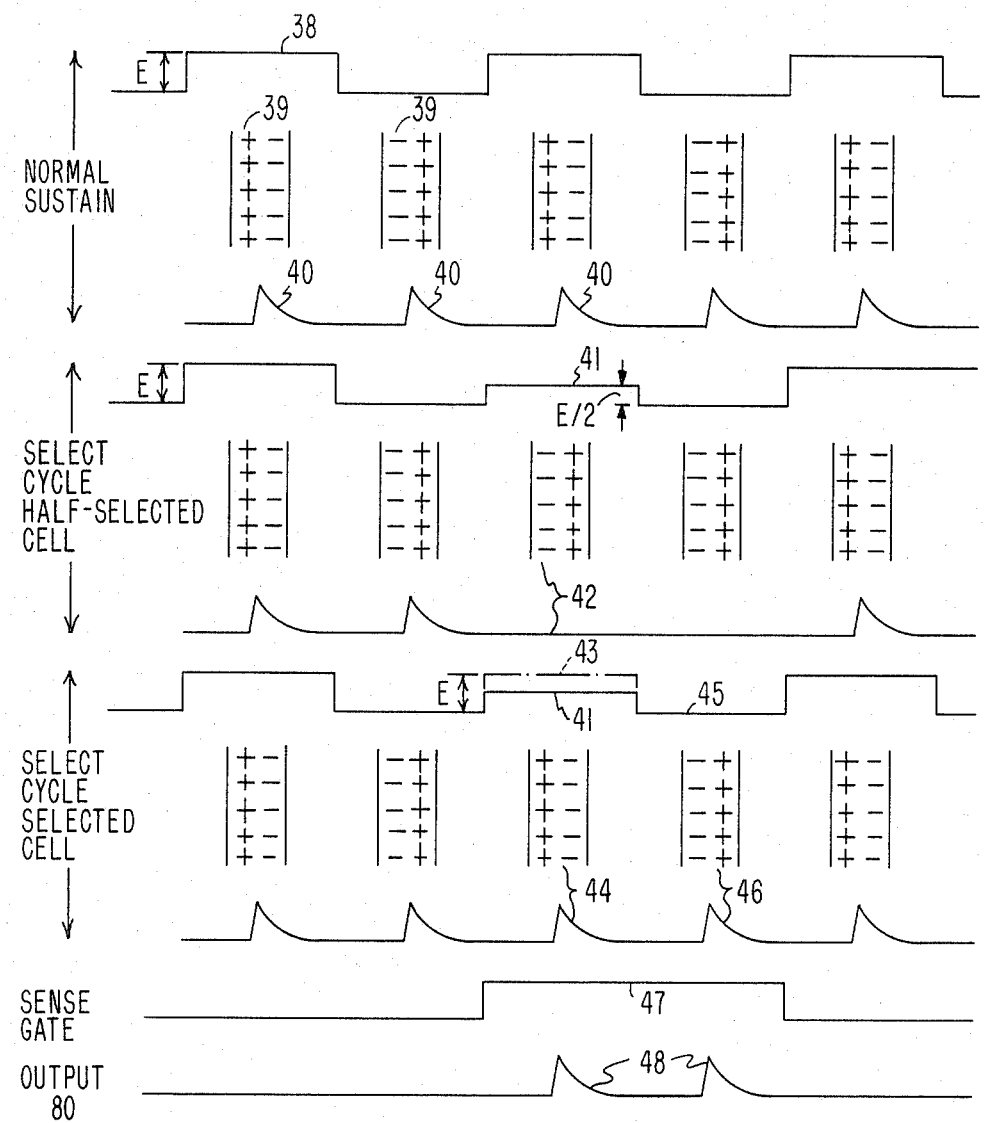
FIG. 2 shows comparative waveforms for regular sustain, partial sustain and complement sustain signals, together with a representation of light pulses resulting, selectively, from either the regular sustain or the addition of the partial sustain and complement sustain signals generated in accordance with FIGS. 1 and 3.

FIG. 2 illustrates this operation. In normal sustain cycles, an A.C. voltage 38 is applied between the X and Y arrays of conductors in the panel 8, thereby reversing the wall charge at each charged cell of the panel twice each sustain cycle. In FIG. 2, a single such cell 39 is shown undergoing this charge reversal. Each time the charge reverses, the gas at the cell is ionized and a flask of light 40 is emitted from the cell. Only the cell wall surfaces are shown. Wall constructions for A.C. gas panels are well known; U.S. Pat. Nos. 4,053,804 and 4,207,488 show examples.

In a selective sustain cycle, a half cycle 41 of the sustain voltage 38 is altered so as to become insufficient in itself to ionize the cells. Therefore the cell wall charge remains unreversed and no light is emitted, as indicated at 42. To test, or read, the charged/non-charged condition of a given cell, the addressing mechanism is utilized to add a supplemental pulse 43 to the altered (half-sustain) pulse 41 so that, together, 41 and 43 are of sufficient amplitude to ionize the gas in the addressed cell so that its charge reverses and a light pulse is emitted, as shown at 44. When the second half 45 of the altered sustain cycle occurs, the cell charge reverses and a flash of light is emitted again, as indicated at 46. Thus the two charge reverse/flash emission occurrances 44 and 46 characterize the operation of the selected cell. Optical sensing means, to be described, samples the light output at time 47 so as to detect the light pulses 48 emitted from the addressed cell only as opposed to light 40 from normal sustain operation before or after the selective sustain cycle.

It is noted that the second of the output pulses 48 is redundant. This redundancy can be used to check proper operation of the panel or as an aid in discriminating against ambient optical noise, if desired. In any case, the detected light output indicates that the addressed cell was (and is) charged, i.e. it represents a "1" data bit or lighted pel. If no output is detected, then a "0" bit (unlighted pel) status of the cell can be inferred.

As shown by dot-dash lines in FIG. 1, the panel 8 may be considered for detection as divided up into a number of overlapping segments 50, 52, 54, and 56. Four are shown. If needed, crossed polarizers 58, 60 are placed over the front (viewing) and rear sides of the panel, respectively. Each segment is viewed from the back by an optic fiber 62, so that in aggregate the fibers view the entire panel. More or fewer segments and fibers could be used, depending on the viewing angle of each fiber and the depth of the panel housing (not shown). The other ends of the optic fibers are bundled to direct their light through optic filter 64 to photo detector 66. The optic filter 64 is designed to pass primarily a prominent emission line of the gas in the gas panel. This combined with the cross polarizers 58 and 60 blocks ambient light from the photo detector.

Photo detector 66 provides an electrical output proportional to the light from the entire panel. This light is a combination of ambient light which passed through 58, 60 and 64 and panel light which includes any selected pels plus any late recombination light from previous operation. The latter can be reduced by inhibiting all sustain operation for a short time before the interrogation process in accordance with the invention in commenced. A band pass electrical filter 68 operates to distinguish the desired light pulse from ignited pels from the background light, by blocking all but the high slope pulses characteristic of the detected pel light. The signal from the band pass filter on line 70 indicates at least one ignited pel when it exceeds a threshhold and conditions a gate in block 72 at the time of a sample pulse on line 74. This signal appears as an output on line 76 for storage in a buffer 78 or can be taken as a direct output 80 depending on the use to which the interrogation is being put. As shown in FIG. 2, the sample pulse 47 may be long enough to sense both pulses 48, and circuitry (not shown) can be provided to make use of that redundancy.

For a more rapid initial scan of the panel, the selective sustain action can be applied to all pels in a row (or a column) simultaneously, or to a column-row set defining a portion of the panel. In the case where multiple pels have been interrogated an output pulse merely indicates that at least one of the pels contains a logical "1". If successive halving of the group is done on successive cycles, the content of all pels can be resolved. This is especially valuable for maintaining reading speed in a panel containing sparse "1"s (the usual condition).

For interrogating a known limited area, an alternate sensing mechanism can be placed in a stylus 82 to provide light pen operation. The stylus 82 includes a color filter similar to optic filter 64 and photo detector such as a photo transistor, and is connected via a flexible cable 84 to a band pass filter and amplifier 68'. Alternatively the photo detector can be incorporated in element 68' and cable 84 can be a fiber optic link, for example. A switch 86 selects between the outputs of 68' and 68.

Either sensing mechanism configuration (62 etc. or 82 etc.) can be used in conjunction with the buffer 78 to preserve the underlying information stored in the panel 8 for interactive signals generally and particularly to facilitate temporary replacement of data in the panel with, e.g. cursor symbol so that the cursor has freedom to occupy any position.

Figure 3:
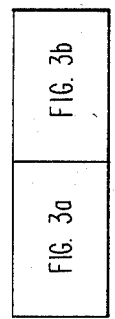
Figure 3B:
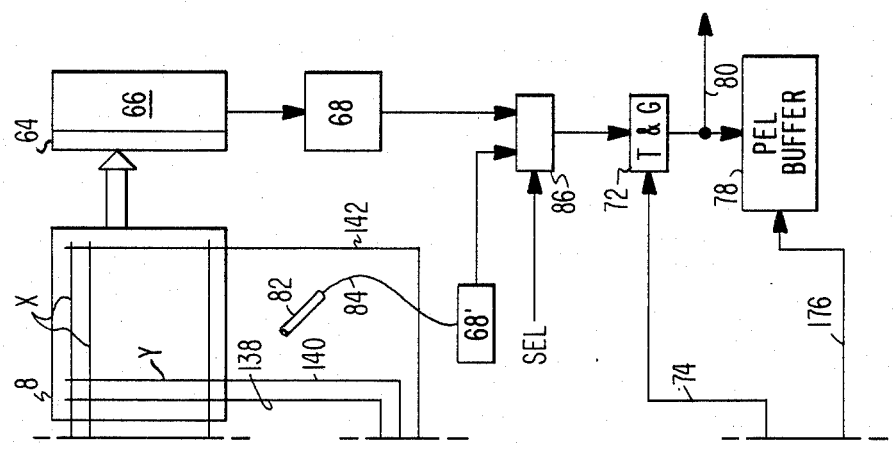
Figure 3A:
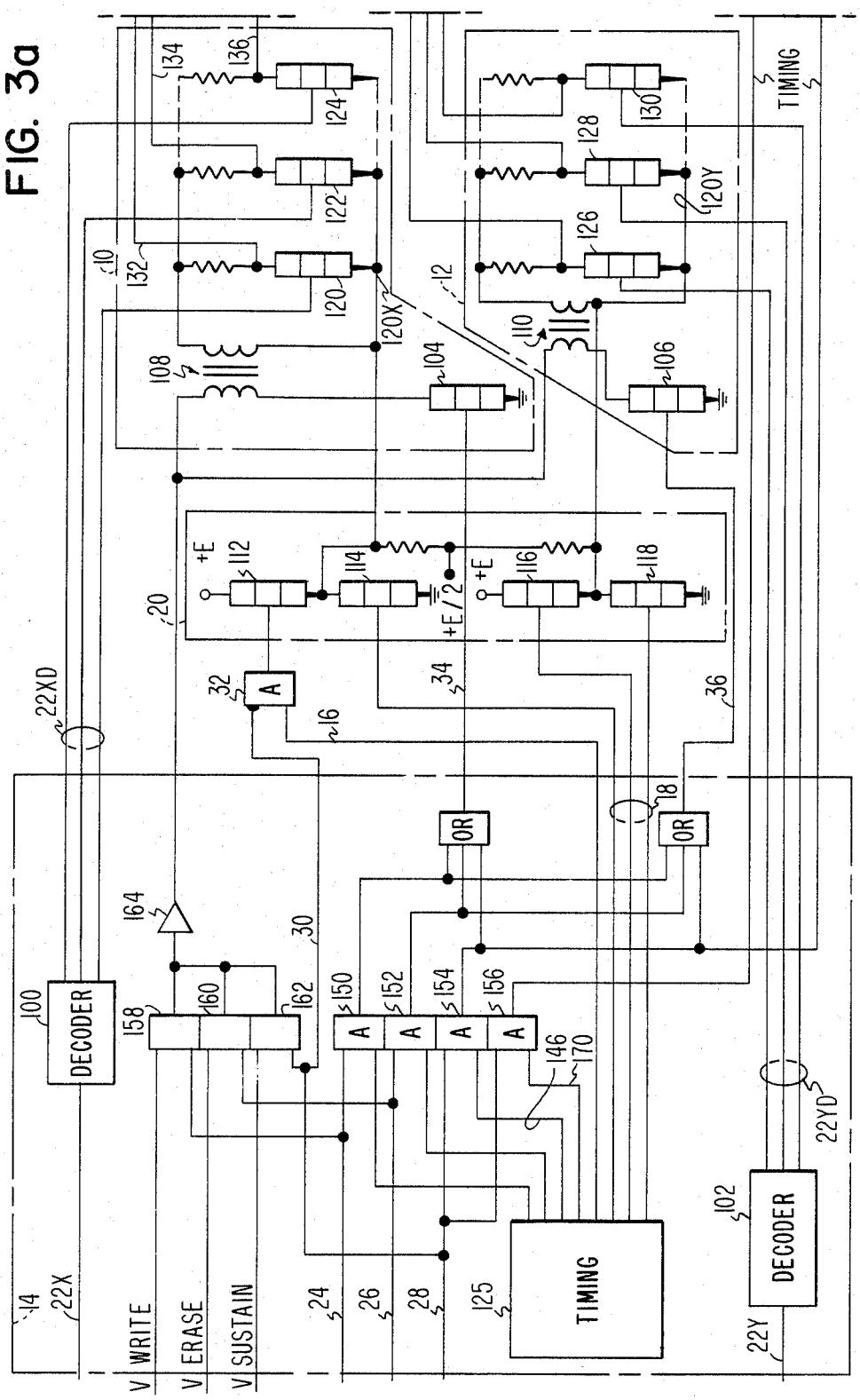

FIG. 3 shows an example of circuitry suitable for use in implementing the system of FIG. 1. Major elements of FIG. 1 are given corresponding reference numbers in FIG. 3.

The X, Y array of conductors in panel 8 are addressed by operation of circuits 10, 12 which are responsive to X and Y address decoders 100, 102 and are enabled for selective sustain operation by drivers 104, 106, via transformers 108, 110. This addressing and its enablement is also used for write and erase operations. Write and erase operations of this kind are well known in the prior art and do not form part of the present invention.

Sustain drive 20 is shown to be implemented by pairs of drivers 112, 114 and 116, 118 which in normal sustain operation provide +E and ground levels in alternation, so as to impose the regular sustain waveform 38 of FIG. 2 on busses 120X, 120Y of the X, Y drive circuitries 10, 12. When drivers 112 and 118 are on and 114 and 116 are off, bus 120X is at +E and bus 120Y is at ground. When 112 and 118 are off and 114 and 116 are on, bus 120X is at ground and bus 120Y is at +E. When all of 112, 114, 116, 118 are off, both busses are at +E/2.

In accordance with the present invention, selective sustain operation is provided by the introduction of gate 32 in the base control of bus driver 112. Gate 32 is an AND circuit having one input 16 which in other respects is like the base drive inputs 18 to the other bus drivers. The other input 30 to gate 32 is applied through an inverting input thereto. Thus a signal on line 30 is operative to inhibit operation of driver 112 so that, when the companion driver 114 is turned off by timing 125, bus 120X rises only to voltage E/2, which is the half sustain level 41 shown in FIG. 2.

Decoders 100, 102 energize lines 22XD and 22YD in accordance with the addresses supplied from any desired source (not shown), such as a computer, counter, etc. The addresses can define a unique pel, or they can be "broadcast" addresses which are decodable at 100,102 to energize groups of lines 22XD and 22YD to define quadrants or other segments of the panel 8. The signals on lines 22XD are down-level significant and on lines 22YD are up-level significant. The signals on lines 22XD and 22YD are applied as base drives to transistors 120, 122, . . . 124 and 126, 128, . . . 130 to clamp respective X panel drive lines 132, 134 . . . 136 and Y panel drive lines 138, 140 . . . 142 to the respective busses 120X, 120Y. When not so clamped, the X and Y panel drive lines are free to rise above the potentials on the busses 120X, 120Y by an amount supplied, via the respective collector resistors for those transistors, from the respective secondary windings of transformers 108 and 110.

Accordingly, those X panel lines which are addressed by a down level on the respective lines 22XD receive the output signal on bus 120X of sustain drive circuit 20 plus an A.C. component from transformer 108. This A.C. component from the X transformer 108 supplies the supplemental pulse signal 43 (FIG. 2) when driver 104 is turned on.

In like manner, Y panel lines are addressed, in this case by an up level, on respective lines 22YD which clamps the addressed lines to the bus 120Y. It is noted that transformers 108 and 110 not only enable the associated transistors 126, 128 . . . 130 and 132, 134 . . . 136 with collector voltage; they also provide pulses used as components of the selective sustain signals.

Tables I and II summarize the operation for normal and selective sustain cycles, respectively:

TABLE I

| Normal Sustain: | |
| --- | --- |
| First Half Cycle: | |
| AND 32 conditioned (28 off, 30 down) | |
| Transistors 104 and 106 off | |
| All X lines 132, 134 . . . 136: | All Y lines 138, 140 . . . 142: |
| +E at 114 collector (112 on, 114 off) | 0 at 118 collector (116 off, 118 on) |
| 0 added at 108 secondary (104 off) | 0 added at 110 secondary |
| +E = Total on all X lines | 0 = Total on all Y lines |
| (from 120 via 108 secondary and emitter resistors of 120, 122 . . . 124) | (from 122 via 110 secondary and emitter resistors of 126, 128 . . . 130) |
| Net difference = +E, all charged cells ignite | |
| Second Half Cycle: | |
| AND 32 conditioned (28 off, 30 down) | |
| Transistors 104 and 106 off | |
| All X lines 132, 134 . . . 136 | All Y lines 138, 140 . . . 142: |
| 0 at 114 collector (112 off, 114 on) | +E at 118 collector (116 on, 118 off) |
| 0 added at 108 secondary (104 off) | 0 added at 110 secondary |
| 0 = Total on all X lines | +E = Total on all Y lines |
| Net difference = −E, all charged cells ignite | |

TABLE II

| Selective Sustain Examples | | |
| --- | --- | --- |
| Selected Cell | X line 132 | Y line 138 |
| | +E/2 at 114 collector (112 and 114 off) | 0 at 118 collector (116 off, 118 on) |
| | +E/2 added at 108 secondary (120 off) | 0 at 126 collector (126 on) |
| | +E = total on line 132 | 0 = total on line 138 |
| | Net Difference = +E, cell ignites if has wall charge | |
| Non Selected Cell | X line 134 | Y line 140 |
| | +E/2 at 114 collector (112 and 114 off) | 0 at 118 collector (116 off, 118 on) |
| | 0 added by 108 secondary (122 on) | +E/2 added at 110 secondary (128 off) |
| | +E/2 = Total on line 134 | +E/2 = Total on line 140 |
| | Net Difference = 0, cell does not ignite | |
| Second Half Cycle: | | |
| Selected Cell | X line 132 | Y line 138 |
| | 0 at 114 collector (112 off and 114 on) | +E at 118 collector (116 on, 118 off) |
| | 0 added by 108 secondary (146 down, 104 off) | 0 added by 110 secondary (146 down, 106 off) |
| | 0 = Total on X line 132 | +E = Total on Y line 138 |
| | Net Difference = −E, cell ignites if has wall charge | |
| Non Selected Cell | X line 134 | Y line 140 |
| | same as selected cell | same as selected cell |
| | Net difference = −E, cell does not ignite because wall charge, if any, was not reversed in first half cycle | |

It will be obvious that non-addressed cells (including half-selected cells) will not be "sustained", i.e. ignited, in any event, and that "broadcast" addressed cells will sustain in the same manner as individually addressed cells. Referring to table II X line 132 is selected and Y line 140 is not selected. This is a half select condition. It will be observed that the voltage difference at such a half select cell is +E/2. This is not sufficient to ignite the cell.

FIG. 3 also shows schematic representations of input logic for operation of the above described circuitries, and output devices for detecting and utilizing the information read from the panel 8 as aforesaid.

The addresses received on lines 22X and 22Y can be from any convenient source such as a data processing system (not shown). The same source can supply the Write, Erase and Selective Sustain commands on lines 24, 26 and 28, respectively. Each of these command signals cooperate with timing 125 and AND, OR circuitry as shown to provide the required signals on lines 30, 34 and 36. Timing 125 can be free running, or responsive to the commands, as desired. In either event, the desired timing outputs are selected by AND gates 150, 152, 154, 156 as shown. Appropriate voltage levels are provided as shown to energize analog gates 158, 160, 162 to provide drive voltage via amplifier 164, as selected by the commands on lines 24, 26, 28.

AND gate 154 is energized for the first half of the selective sustain cycle, and its output could be used to operate the sense gate 72 by which a detected light pulse can be passed to the output. However, gate 154 is operative only during the first half of a selective sustain cycle. To sense both flashes 44 and 46, a full selective sustain cycle time signal 170 is ANDed at 156 to provide a sense timing signal on line 74 which strobes the sense gate 72. Gate 154 can be used to step the output buffer 78 once each selective sustain cycle, via line 176. The redundant pulse will simply over-write in buffer 78. A serial output 80 will provide a pulse for each detected flash, however, and can be used as an input to error detecting circuitry, not shown, if desired.

The output at 80 can also be used, by connection to a data processor which provides the input addresses and commands, as a source of information on a real-time basis for executing routines for carrying out a rapid search of the panel 8. This could provide a fast means of skipping over blank lines or shorter segments by multiple pel read out with elimination of areas of all zero readout and successive halving of the size of areas with at least a single "1" bit readout.

The buffer 78 can serve as a "scratch pad" memory to preserve data which is temporarily traversed on the display as the processor moves a cursor through the data field. The mechanics of using a scratch pad buffer are well known; therefore the read out means for buffer 78 are not shown.

It should be understood that not all of the panel cells need be picture elements, i.e. "pels" in the usual sense. However, the cells, whether or not visable to an observer, should be "visable" to the detection apparatus, such as from the back of the panel, as described.

What is claimed is:

1. A gas panel system comprising means including addressing means for executing a selective sustain cycle with the first half of the sustain drive at least partially missing at the positions of all or a large group of cells of the panel so as to constitute, at most, a partial-sustain signal having no independent effect, and
    means for supplying the missing half cycle component to a particular cell or cells by operation of said addressing means,
    so that the information content at the addressed cells can be read optically.

2. A system according to claim 1, further including flash detection means which respond to the gas panel so as to enable automatic read out of the data stored in the panel.

3. An optical detection system for gas panel arranged in operation for viewing from the front side thereof and including means mounted relative to the rear side thereof to detect light flashed from the rear of the gas panel.

4. An optical detection system for a gas panel arranged in operation to detect light flashed from the rear of the panel,
    said system including crossed polarizers arranged effectively at opposite sides of the panel to exclude ambient light from detection.

5. A gas panel of the type having row and column coordinate wires forming a matrix of light emitting cells, means for applying a sustain voltage to said column wires to produce an alternating polarity sustain voltage across each cell to produce a succession of brief light flashes from any previously written cell, and means for addressing particular row and column wires for write and erase operations, the improvement comprising, means for reducing the sustain voltage of the cells defined by at least certain of said coordinate wires, whereby the sustain voltage of cells thereat is insufficient to ignite said cells, and
    means for selectively superimposing a complementary sustain pulse on the means for applying the sustain voltage to addressed ones of the row and column wires so as to provide an effective sustain level thereat.

6. A gas panel according to claim 5, further including means to detect flashes of light emanating from said cells.

7. A gas panel according to claim 6 wherein said means to detect comprises an optical detection system for gas panel arranged in operation to detect light flashed from the rear of the gas panel.

8. A gas panel according to claim 7 wherein said means to detect comprises a light pen.

9. A gas panel according to any one of claims 6, 7, or 8, further comprising a buffer for storing data corresponding to the detected flashes of light.

10. A gas panel system comprising means including addressing means for executing a selective sustain cycle with the first half of the sustain drive at least partially missing at the positions of all or a large group of cells of the panel so as to constitute, at most, a partial-sustain signal having no independent effect, and
    means for supplying an operative substitute for the missing half cycle component to a particular cell or cells by operation of said addressing means.

* * * * *